United States Patent Office 3,485,792
Patented Dec. 23, 1969

---

3,485,792
COMPOSITIONS OF POLYFLUOROKETONE/ EPOXIDE COPOLYMERS AND AN ORGANIC THERMAL STABILIZING ADDITIVE
Edward George Howard, Jr., Hockessin, Del., assignor to E. I. du Pont de Nemours and Company, Wilmington, Del., a corporation of Delaware
No Drawing. Filed Jan. 7, 1966, Ser. No. 519,187
Int. Cl. C08g 51/58
U.S. Cl. 260—45.7                                    10 Claims

ABSTRACT OF THE DISCLOSURE

Copolymers of polyfluoroketones and epoxy compounds useful as water repellant coatings can be improved in thermal stability by basic, organic hydrogen-bonding compounds.

---

This invention concerns polymeric compositions and process for their preparation. More specifically, the invention is directed to heat-stabilized compositions of a polyfluoroketone/epoxide copolymer and a thermal stabilizing additive; and to a process for the preparation of the compositions.

Copolymers prepared from polyfluoroketone and epoxide monomers have been found useful as coatings to impart water-insensitivity to substrates, or as treating agents for cloth or paper to impart water-repellency thereto. However, these copolymers are subject to thermal instability thus limiting their application.

It has now been found that such copolymers are thermally stabilized, without loss of desirable properties, by the addition to the copolymer, of a functionally substituted basic organic compound which is characterized by its ability to shift the O-D infrared absorption band in $CH_3OD$ or the N-H band in pyrrole by at least $0.02\mu$ (50 cm.$^{-1}$) from the normal position. The shift in the infrared and is a measure of the basicity of the organic additives as discussed by Gordy and Standford, J. Chem. Phys. 9, 204–14 (1941) and 8, 170–7 (1940) and G. C. Pimentel and A. L. McClellan, "The Hydrogen Bond," W. H. Freeman & Co. (1960), pp. 90–91. The additives with the largest shifts provide the most heat stable compositions of this invention.

The heat stabilized compositions of this invention can be obtained simply by dissolving the thermal stabilizing additive in an inert solvent, adding it to the copolymer (which is preferably in finely divided form), and grinding the ingredients together while the solvent evaporates. Alternatively, both the copolymer and the additive can be dissolved in the inert solvent and the solvent evaporated, or they can be ground together in the absence of a solvent. In all methods, a thermally stable mixture of the copolymer and the additive is obtained.

The polyfluoroketones used in preparing the copolymers of the compositions of this invention have the structural formulae

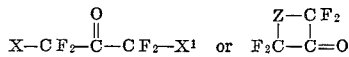

wherein X and $X^1$ are each hydrogen, halogen of atomic number 9–35, i.e., fluorine, chlorine or bromine, or polyfluoroalkyl of up to 18 carbon atoms and Z is polyfluoroalkylene of 1–3 carbon atoms. Because of availability, X and $X^1$ are preferably fluorine; thus resulting in the ketone hexafluoroacetone.

Examples of the polyfluoroketones include perfluoroacetone,
1H,3H-perfluoropropanone,
1-chloropentafluoropropanone,
perfluoropentane-2-one,
9-bromoperfluorononane-4-one,
perfluorododecane-5-one,
1H,7H-dodecafluoroheptane-3-one,
1,5-dichloroperfluoropentane-3-one,
1,9-dibromoperfluorononane-5-one,
1,17-dichloroperfluoroheptadecane-9-one,
perfluorocyclobutanone,
3-chloro-2,2,3,4,4-pentafluorocyclobutanone,
3-bromo-2,2,3,4,4-pentafluorocyclobutanone,
perfluorocyclohexanone, and the like.

The epoxides used in preparing the copolymers of the compositions of this invention have the formula

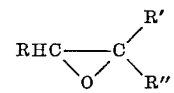

wherein R, R' and R" each represent hydrogen, cyano, carboxy, alkyl of up to 18 carbons, alkenyl of up to 18 carbons, aryl of up to 14 carbons, aralkyl of up to 12 carbons, cycloalkyl of up to 7 carbons, alkoxyalkyl of up to 18 carbons, aryloxyalkyl of up to 14 carbons, haloalkyl of up to 18 carbons in which the halogen is of atomic number 9–35; hydroxyalkyl of up to 18 carbons; and alkoxycarbonyl, carbocyclooxyalkylenyl, carbacyl, carboxyalkylenyl, and alkoxycarbonylalkylenyl, each of up to a total of 18 carbons. R and R" can also be joined to form an alkylene group of 2–6 carbons. A separate formula for those reactants in which R and R" are joined can be written as

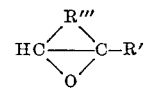

where R''' is alkylene of 2–6 carbons. The preferred epoxides are those in which R, R' and R" are hydrogen, alkyl or alkenyl of up to 7 carbons, phenyl, cyclohexyl or aralkyl of up to 8 carbons, or those in which R''' forms with the

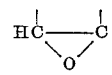

radical a carbocyclic ring of up to 6 carbons. Most preferred because of good copolymer properties are those wherein R and R' are hydrogen and R" is lower alkyl, e.g., ethylene oxide and propylene oxide, especially the former.

Examples of the epoxides include ethylene oxide,
1,2-epoxypropane,
1,2-epoxybutane,
2,3-epoxybutane,
2,3-epoxypentane,
2-phenyl-1,2-epoxypropane,
1,2-epoxydecane,
1,2-epoxyoctadecane,
2-methyl-4-phenyl-1,2-epoxybutane,
1,2-epoxycyclopentane,
1,2-epoxycyclohexane,
1,2-epoxy-3-methylcyclohexane,
1,2-epoxy-1-phenylethane,
3,4-epoxy-1-butene,
3,4-epoxy-1-octadecene,
3-methoxy-1,2-epoxypropane,
3-phenoxy-1,2-epoxypropane,
3-(2-methylethoxy)-1,2-epoxypropane,
4-hydroxy-1,2-epoxybutane,
2-butyl-1,2-epoxyhexane,
3-bromo-1,2-epoxypropane,
4-chloro-1,2-epoxybutane,
3-fluoro-1,2-epoxypropane,
1-cyano-1,2-epoxypropane,
ethyl-2,3-epoxybutanoate,
1,2-epoxydecanoic acid,
1,2-epoxypropanoic acid,
2-methyl-1,2-epoxypropanoic acid,
4-keto-2,3-epoxypentane, and the like.

The copolymers of the above-described ketones and epoxides are prepared simply by mixing the reactants at a temperature of about −40° C. to +30° C. in the substantial absence of water and other protonated solvents, in any proportions, although preferred proportions are in the range of 0.01:1 to 1:1 mole ratios of polyfluoroketone to epoxide, in which case the resulting copolymer will have mole ratios within the same range. A catalyst is employed and these include alkyl sulfoxides; alkali metal fluorides, cyanides, cyanates, thiocyanates, alkoxides or acylates; tetraalkyl-, trialkylaryl- and trialkylaralkylammonium chlorides, cyanides and hydroxides; pyridine and tertiary lower-alkyl amines. Pressure employed is usually autogenous and the amount of the catalyst employed ranges from 0.001% to about 5% of the polyfluoroketone employed. The polymers employed in the compositions of this invention are more fully described and claimed in copending application Ser. No. 451,217, filed Mar. 11, 1964 in the names of F. S. Fawcett and E. G. Howard, Jr., now U.S. Patent No. 3,316,216.

The additives employed in the compositions and process of this invention are basic organic compounds which boil above 150° C. at atmospheric pressure and contain functional groups, in which the basicity, as determined by the shift in the infrared spectrum described previously, exceeds $0.02\mu$ (50 cm.$^{-1}$). Classes of organic compounds usable include the following: (Representative basicities in cm.$^{-1}$ shifts are in parentheses.)

(1) Aryl or alkaryl esters of phosphoric, phosphorous or sulfonic acids having a total of up to 30 carbon atoms. These are exemplified by tri-o-cresyl phosphate (95), o-cresyl o-toluenesulfonate, triphenyl phosphate, phenyl p-toluenesulfonate, and the like;

(2) Hydrocarbon esters of up to 30 carbon atoms per ester group, exemplified by triacetin, dibutyl phthalate (63), dioctyl phthalate (56), diphenyl succinate, diphenyl phthalate, polyvinyl acetate, polymethyl methacrylate, phenyl benzoate, di-n-hexyl carbonate, isobutyl carbonate (124), n-amyl propionate, diethyl oxalate (124), phenyl acetate, benzyl benzoate (124), butyl phthalate, and the like.

(3) Hydrocarbon ethers of up to 30 carbon atoms such as diphenyl ether, dinaphthyl ether $$C_6H_5OCH_2CH_2OC_6H_5$$

$$C_6H_5OC_6H_4OC_6H_5$$

anisole (94), diamyl ether (77), benzyl methyl ether (77), dibenzyl ether (77), phenetole (130), cresyl methyl ether (103), and the like.

(4) Hydrocarbon substituted amines of up to 36 carbon atoms such as aniline (181), diphenylamine, tridodecylamine, octadecylamine, dicyclohexylamine, and the like.

(5) Hydrocarbon amides of up to 30 carbon atoms exemplified by N,N-dimethylformamide, N,N-dimethylacetamide (123), N,N - dimethylcaproamide, N,N - diphenylacetamide, and the like.

(6) Hydrocarbon ketones of up to 35 carbon atoms, such as benzil, acetophenone (101), di-n-heptadecyl ketone, cyclohexanone (70), phenyl isopropyl ketone, acetodurene, benzophenone, 9-anthraphenone, methyl amyl ketone (110), acetonylacetone (103), phenyl propyl ketone (110), and the like.

The term "hydrocarbon" in the foregoing items (2)–(6) is defined as including alkyl, cycloalkyl, aryl, alkaryl, aralkyl, alkenyl, and the like. Alkyl, aryl and alkaryl constitute a preferred class, with aryl and alkaryl being most preferred, especially the latter. With regard to item (1) above, alkaryl is most preferred. Of items (1)–(6), the additives in item (1) are preferred, especially the esters of phosphoric acid. The most preferred individual additive is tri-o-cresyl phosphate. In addition, those additives having a boiling point above 200° C. at atmospheric pressure are preferred.

As stated previously, the compositions are prepared by mixing the additive with the copolymer, preferably in the presence of an inert volatile solvent. The amount of additive employed, and which is contained in the resulting compositions, ranges from 0.1 to 20 percent by weight of the copolymer or copolymers. Preferably the amount of additive will be between 0.1 to 5 percent by weight, and most preferably between 0.5 and 2 percent.

The following examples are provided solely to illustrate the invention, as the invention is not limited to the specific examples shown.

EXAMPLE 1

A. Hexafluoroacetone/ethylene oxide copolymer is prepared as follows: A Pyrex polymer tube (capacity, 250 ml.) was washed with soap, rinsed with water and soaked with dilute nitric acid. The flame dried tube was charged with 22.6 mg. of tetraethylammonium chloride and attached to a vacuum train. The tube was heated with live steam for 5 minutes using a quart Dewar flask as a container while maintaining a vacuum of 10$^{-5}$ mm. of mercury. The tube was then cooled with liquid nitrogen and charged with 166 g. (100 ml. at −78° C., 1 mole) of hexafluoroacetone and 44 g. (1 mole) of ethylene oxide. The tube was sealed and tumbled in a water bath for 1 hour at 25° C., 18 hours at 55° C. and finally 8 hours at 60° C. There resulted 208 g. of polymer.

B. Compositions of this invention, viz, hexafluoroacetone/ethylene oxide copolymer containing the various additives listed in the following Table I were prepared by dissolving the additive (amounts are shown by percent weight in Table I) in ether, adding it in an agate mortar to the finely divided copolymer, and grinding the ingredients with a pestle while the ether evaporated. The table also shows the heat stability, recorded by weight loss, of the compositions after various time periods.

TABLE I.—WEIGHT LOSS OF COMPOSITION IN PERCENT AFTER THESE HOURS AT 207° C.

| Additive (percent) | 0.5 hr. | 1 hr. | 1.5 hr. | 2 hr. | 2.5 hr. | 3.5 hr. | 4.5 hr. | 5.5 hr. | 6.5 hr. | 8.5 hr. |
|---|---|---|---|---|---|---|---|---|---|---|
| None | 14 | | 33 | | 57 | | | | | |
| Phosphorus compounds: | | | | | | | | | | |
| Tri-o-cresyl phosphate (10) | 1.4 | | 1.7 | | 3.7 | 3.7 | 4.2 | 4.8 | 5 | |
| Tri-o-cresyl phosphate (5) | 2.5 | | 2.9 | | 3.3 | 3.4 | | | 3.8 | |
| Tri-o-cresyl phosphate (2) | 1 | | 1.4 | | 1.5 | 1.7 | | | 2.4 | |
| Tri-o-cresyl phosphate (1) | 0.66 | | 0.8 | | | | | | | |
| Tri-o-cresyl phosphate (0.5) | 0.75 | | 0.9 | | | | | | | 11 |
| $(C_6H_5O)_3P$ (10) | | 5.6 | | 12 | | | | | | 1.1 |
| Sulphur compounds: o-Cresyl o-toluene sulfonate (10) | 1.5 | | 5.3 | | 9 | 10.5 | 13 | | | |
| Esters: | | | | | | | | | | |
| Triacetin (5) | 8.5 | | 21 | | 27 | | | | | |
| Di-n-hexyl carbonate (5) | 10.7 | | 17.8 | | 26.1 | | | | | |
| $C_6H_5CO_2C_6H_5$ (5) | 4.9 | | 10.8 | | 19 | | | | | |
| Dioctyl phthalate (5) | 1.8 | | 3.5 | | 5.4 | 7.9 | 9.8 | 12.1 | 15 | |
| Diphenyl succinate (5) | 1.1 | | 1 | | 1.9 | | | | | |
| Polymethyl methacrylate (5) | 2.8 | | 2.3 | | 2.3 | 2.5 | | | | |
| Polyvinyl acetate (5) | 2.3 | | 2.4 | | 10.5 | | | | | |
| Diphenyl phthalate (5) | 0.8 | | 3.5 | | 6.3 | 8.5 | 10.8 | 13 | | |
| Ethers: | | | | | | | | | | |
| $C_6H_5OC_6H_5$ (5) | 4.5 | | 8.6 | | 16.5 | | | | | |
| $C_6H_5OCH_2CH_2OC_6H_5$ (5) | 3.7 | | 4.6 | | 5 | 5.4 | 5.5 | | | |
| $n\text{-}C_6H_5OC_6H_4OC_6H_5$ (5) | 1.3 | | 3.2 | | 4.5 | 5.1 | 5.4 | 6.6 | | |
| Amines: | | | | | | | | | | |
| Diphenylamine (5) | 6.1 | | 5.1 | | 5.2 | 5.4 | 5.5 | 5.5 | | |
| Tridodecylamine (5) | 0.9 | | 1.2 | | 1.4 | 1.6 | 2.1 | 2.0 | 2.1 | |
| Amides: $(C_6H_5)_2NCOCH_3$ (5) | 0.7 | | 1.7 | | 2.3 | 2.8 | 4.3 | 4.7 | | |
| Ketones: $C_6H_5COCOC_6H_5$ (5) | 2.4 | | 10 | | 20 | | | | | |

EXAMPLE 2

A. A clean, evacuated Pyrex tube was charged with 19.7 mg. of tetraethylammonium chloride, 166 g. of hexafluoroacetone, 39.2 g. of ethylene oxide, and 6.4 g. of propylene oxide. The tube was sealed and heated at 60° C. for 6 hours to obtain 215 g. of hexafluoroacetone/ethylene oxide/propylene oxide (9:8:1) copolymer.

B. A portion of the hexafluoroacetone/ethylene oxide propylene oxide copolymer prepared in Part A was stabilized by incorporating 1%, by weight, of tri-o-cresyl phosphate using the procedure of Example 1, Part B. A stability comparision of this stabilized copolymer composition with the unstabilized composition of Part A above is shown in Table II.

EXAMPLE 3

A. A clean, evacuated Pyrex tube was charged with 6.9 mg. of tetraethylammonium chloride, 44.8 g. of hexafluoroacetone, 11.7 ml. of ethylene oxide, and 4.5 ml. of propylene oxide. The tube was sealed, stored for 9 hours at 0° C., and then heated for 17 hours at 60–67° C. to obtain 55 g. of hexafluoroacetone/ethylene oxide/propylene oxide (4:3:1) copolymer.

B. A portion of the hexafluoroacetone/ethylene oxide/propylene oxide copolymer prepared in Part A was stabilized by incorporating 5%, by weight, of tri-o-cresyl phosphate using the procedure of Example 1, Part B. A stability comparison of this stabilized copolymer with the unstabilized composition of Part A above is shown in Table II.

EXAMPLE 4

A. A clean, evacuated Pyrex tube was charged with 3.5 mg. of tetraethylammonium chloride, 5.9 ml. of purified propylene oxide, and 9 ml. of purified hexafluoroacetone. The tube was sealed, stored first for several hours at 0° C., and then was slowly warmed to room temperature. After 3 days, a colorless, elastic plug of hexafluoroacetone/propylene oxide copolymer was obtained.

B. A portion of the hexafluoroacetone/ethylene oxide/copolymer prepared in Part A was stabilized by incorporating 1%, by weight, of tri-o-cresyl phosphate using the procedure of Example 1, Part B. A stability comparison of this stabilized copolymer with the unstabilized composition of Part A above is shown in Table II.

TABLE II

| Composition | Weight loss of composition in percent after these hours at 208–210° C. | | |
|---|---|---|---|
| | 0.5 hr. | 1.5 hr. | 3.5 hr. |
| Example 2: | | | |
| Part A | 2.3 | 8.0 | 24 |
| Part B | 0.9 | 1.3 | 1.4 |
| Example 3: | | | |
| Part A | 4.4 | 16 | 35 |
| Part B | 1.1 | 3.1 | 23 |
| Example 4: | | | |
| Part A | 3.4 | 8.4 | 18 |
| Part B | 1.8 | 2.5 | 2.6 |

EXAMPLE 5

A composition of this invention was prepared by the method of Part B of Example 1 using tri-o-cresyl phosphate in an amount sufficient to give 2.5%, by weight, and the copolymer prepared in Part A of Example 1. This composition was heated at 207° C. for 1.5 hours. During this time the composition lost only 0.6% of its weight. The additive was then removed in two ways. In the first, a portion of the treated polymer was extracted with ether for one day and dried. In the second method, a portion of the polymer was dissolved and precipitated twice from hot 7,7 - di(trifluoromethyl) - 6 - oxatetracyclo-[3.2.1.1$^{3,8}$.0$^{2,4}$]-nonane. The resultant products no longer exhibited thermal stability as shown by the following Table III:

TABLE III

| | Time heated at 207° C. | | |
|---|---|---|---|
| | 0.5 hr. | 1.5 hr. | 2.5 hr. |
| Ether extracted polymer | 9.5 | 23.4 | [1]39 |
| Reprecipitated polymer | 15.8 | 42 | 64 |

[1] Percent weight loss.

The exact relationship between the additive and the copolymer is not known. Example 5 indicates that the compositions are either mixtures or that the additive is weakly complexed with the copolymer. The infrared absorption bands for some of the additives were compared as solutions in dry carbon tetrachloride, which is a hydrogen-free solvent, and as solutions in a hexafluoroacetone/ethylene oxide copolymer. The results are recorded in Table IV as follows:

TABLE IV

| Additive | Group | CCl₄ | Polymer | Remarks |
| --- | --- | --- | --- | --- |
| Dioctylphthalate | C=O | 5.77μ | 5.75μ | In solvent, sharp band. In polymer, broad with three shoulders. |
| (CH₂CO₂C₆H₅)₂ | C=O | 5.63μ | 5.66μ | Sharp in solvent, two shoulders in polymer. |
| (C₆H₅)₂NH | N—H | 2.88μ | 2.92μ | |

These infrared absorption results indicate that there is an association between the copolymer and the additive.

By employing in general the method of Example 1-A, any of the polyfluoroketone monomers mentioned previously can be polymerized with any of the epoxides mentioned previously to obtain the copolymers used in the compositions of this invention. For example, the following polymers can be obtained from their respective monomers: hexafluoro - acetone/1,2 - epoxypropane, hexafluoroacetone/1,2 - epoxycyclohexane, chloropentafluoroacetone/ethylene oxide, hexafluoroacetone/1,2 - epoxy-4-vinylcyclohexane, hexafluoro - acetone, 3 - phenoxy-1,2-epoxypropane, hexafluoroacetone/3,4-epoxybutene-1, and hexafluoroacetone/methyl-1,2-epoxypropane.

As Table I shows, the compositions of this invention are surprisingly more stable to heat up to 207° C. Preferred composition those containing additives which lose less than 5% by weight after 2.5 hours at 207° C.

Because the additive improves the heat-resistivity of the copolymers without altering the other useful properties of the copolymer, in particular the water-repellency properties, the compositions of this invention find utility in applications similar to that of the untreated polymer. Thus, the compositions of this invention can be sprinkled on paper and the paper then subjected to 3000 lb./sq. in. pressure at 150–215° C. to obtain a water-resistant film or coating over the paper.

Since it is obvious that many changes and modifications can be made in the above-described details without departing from the nature and spirit of the invention, it is to be understood that the invention is not to be limited to said details.

The embodiments of the invention in which an exclusive property or privilege is claimed are defined as follows:

1. A composition comprising a mixture of
(A) an addition polymer of
(1) at least one polyfluoroketone of the group consisting of

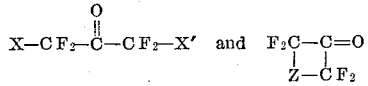

wherein X and X' are selected from the class consisting of hydrogen, fluorine, chlorine, bromine and polyfluoroalkyl of up to 18 carbons and Z is polyfluoroalkylene of 1–3 carbons; and
(2) at least one epoxide of the group consisting of

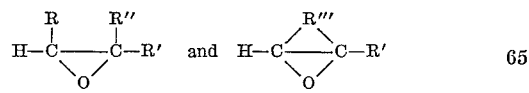

wherein R, R' and R" are selected from the class consisting of hydrogen, cyano, carboxy, alkyl, alkenyl, alkoxyalkyl, haloalkyl in which the halogen is of atomic number 9–35, hydroxyalkyl, alkoxycarbonyl, carbocyclooxyalkylenyl, carbacyl, carboxyalkylenyl and alkoxycarbonylalkylenyl of up to 18 carbons, aryl and aryloxyalkyl of up to 14 carbons, aralkyl of up to 12 carbons, and cycloalkyl of up to 7 carbons, and R''' is alkylene of 2–6 carbons;
(3) the mole ratio of polyfluoroketone to epoxide being in the range 0.01 to 1:1; and
(B) an additive, in an amount of 0.1 to 20% by weight of said polymer of a basic organic compound consisting of an aryl or alkaryl ester of phosphoric, phosphorous or sulfonic acid having a total of up to 30 carbon atoms, characterized by having a boiling point above 150° C. at atmospheric pressure and by its ability to shift the O-D band in the infrared spectrum of CH₃O—D by at least 50 cm.⁻¹.

2. The composition of claim 1 wherein the additive is present in an amount of 0.1 to 5 percent by weight of said polymer.

3. The composition of claim 2 wherein the additive is an alkaryl ester of phosphoric acid of up to 30 carbon atoms.

4. The composition of claim 2 wherein the polyfluoroketone is hexafluoroacetone.

5. The composition of claim 4 wherein the epoxide is

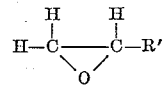

wherein R' is lower alkyl.

6. The composition of claim 5 wherein the additive is an alkaryl ester of phosphoric acid.

7. A composition comprising
(A) an addition polymer of
(1) at least one polyfluoroketone of the group consisting of

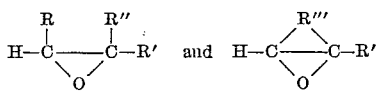

wherein X and X' are selected from the class consisting of hydrogen, fluorine, chlorine, bromine and polyfluoroalkyl of up to 18 carbons and Z is polyfluoroalkylene of 1–3 carbons; and
(2) at least one epoxide of the group consisting of

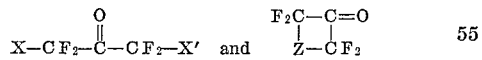

wherein R, R' and R" are selected from the class consisting of hydrogen, cyano, carboxy, alkyl, alkenyl, alkoxyalkyl, haloalkyl in which the halogen is of atomic number 9–35, hydroxyalkyl, alkoxycarbonyl, carbocyclooxyalkylenyl, carbacyl, carboxyalkylenyl and alkoxycarbonylalkylenyl of up to 18 carbons, aryl and aryloxyalkyl of up to 14 carbons, aralkyl of up to 12 carbons, and cycloalkyl of up to 7 carbons, and R''' is alkylene of 2–6 carbons;
(3) the mole ratio of polyfluoroketone to epoxide being in the range of 0.01 to 1:1; and
(B) an additive of from 0.1 to 5% by weight of tri-o-cresyl phosphate.

8. A composition comprising
(A) an addition polymer of hexafluoroacetone and an epoxide having the formula

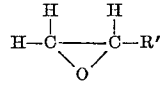

wherein R' is lower alkyl, the mole ratio of hexafluoroacetone to epoxide being in the range 0.01 to 1:1 and (B) an additive in an amount of 0.01 to 5% by weight of tri-o-cresyl phosphate.

9. The composition of claim 8 wherein the epoxide is ethylene oxide.

10. The composition of claim 8 wherein the epoxide is propylene oxide.

References Cited

UNITED STATES PATENTS 3,316,216   4/1967   Fawcett _____ 260—63

OTHER REFERENCES

Pimentel et al., "The Hydrogen Bond," W. H. Freeman & Co., San Francisco, 1960, QD471P5, p. 90.

DONALD E. CZAJA, Primary Examiner

M. J. WELSH, Assistant Examiner

U.S. Cl. X.R.

260—45.9, 45.85